Jan. 8, 1963 C. P. ROHMANN ET AL 3,072,326

FLUID-PRESSURE-OPERATED COMPUTER

Filed Jan. 29, 1960 3 Sheets-Sheet 1

INVENTORS.
CHARLES P. ROHMANN
ROBERT B. WATROUS
BY Arthur H. Swanson
ATTORNEY.

INVENTORS.
CHARLES P. ROHMANN
ROBERT B. WATROUS
BY Arthur H. Swanson
ATTORNEY.

INVENTORS.
CHARLES P. ROHMANN
ROBERT B. WATROUS
BY Arthur H. Swenson
ATTORNEY.

United States Patent Office 3,072,326
Patented Jan. 8, 1963

3,072,326
FLUID-PRESSURE-OPERATED COMPUTER
Charles P. Rohmann, Hatboro, and Robert B. Watrous, Philadelphia, Pa., assignors to Minneapolis-Honeywell Regulator Company, Minneapolis, Minn., a corporation of Delaware
Filed Jan. 29, 1960, Ser. No. 5,449
8 Claims. (Cl. 235—61)

This invention relates to a fluid-pressure-operated computer.

Such computers are adapted to receive an input signal and to produce an output signal which will measure, indicate, record or control other mechanism in response to the input signal. Moreover, such computers are adapted to produce an output signal which varies in some mathematical relationship to the input signal such as multiplication, division, square or square root function.

Such computers comprise a stationary element on which is mounted a support which guides a movable member for rectilinear or rotary movement relative to said support. Means are provided for causing an input signal to move said member in one direction in response to said input signal. Other means are provided for moving said member in the opposite direction so as to provide a feedback or balance of the movable member. One of said means is mounted so as to move said member with a constant force or with a constant mechanical advantage while other means are provided to vary the force and the distance and hence the mechanical advantage which the other of said means applies to said movable member.

It is an object of this invention to provide means for applying a number of input signals, such as forces, to a movable member, such as a lever, and to provide freedom of action between said input forces so that each input force may vary independently of and without interaction with any other input force.

It is a further object of this invention to provide means for applying an input signal, such as a force, to a movable member, such as a lever, and to vary both the strength of the input signal, such as a force, and the mechanical advantage with which said input signal is applied, such as the distance from the pivot of a lever which said input signal is applied to the lever without disturbance of or interaction with any other input.

More specifically, it is an object of this invention to provide means for applying a force to a lever at a varying mechanical advantage and at a varying distance from the pivot of the lever which means comprise a cantilever mounted on a pivot at an angle to the pivot of the lever; and means movable at a constant mechanical advantage by said cantilever and movable parallel to the pivot for the cantilever and at an angle to the pivot for the lever so as to vary the point of application of the force to the lever.

A better description of the present invention may be had from the following detailed description when read in connection with the accompanying drawings, in which.

Figures 1, 2:
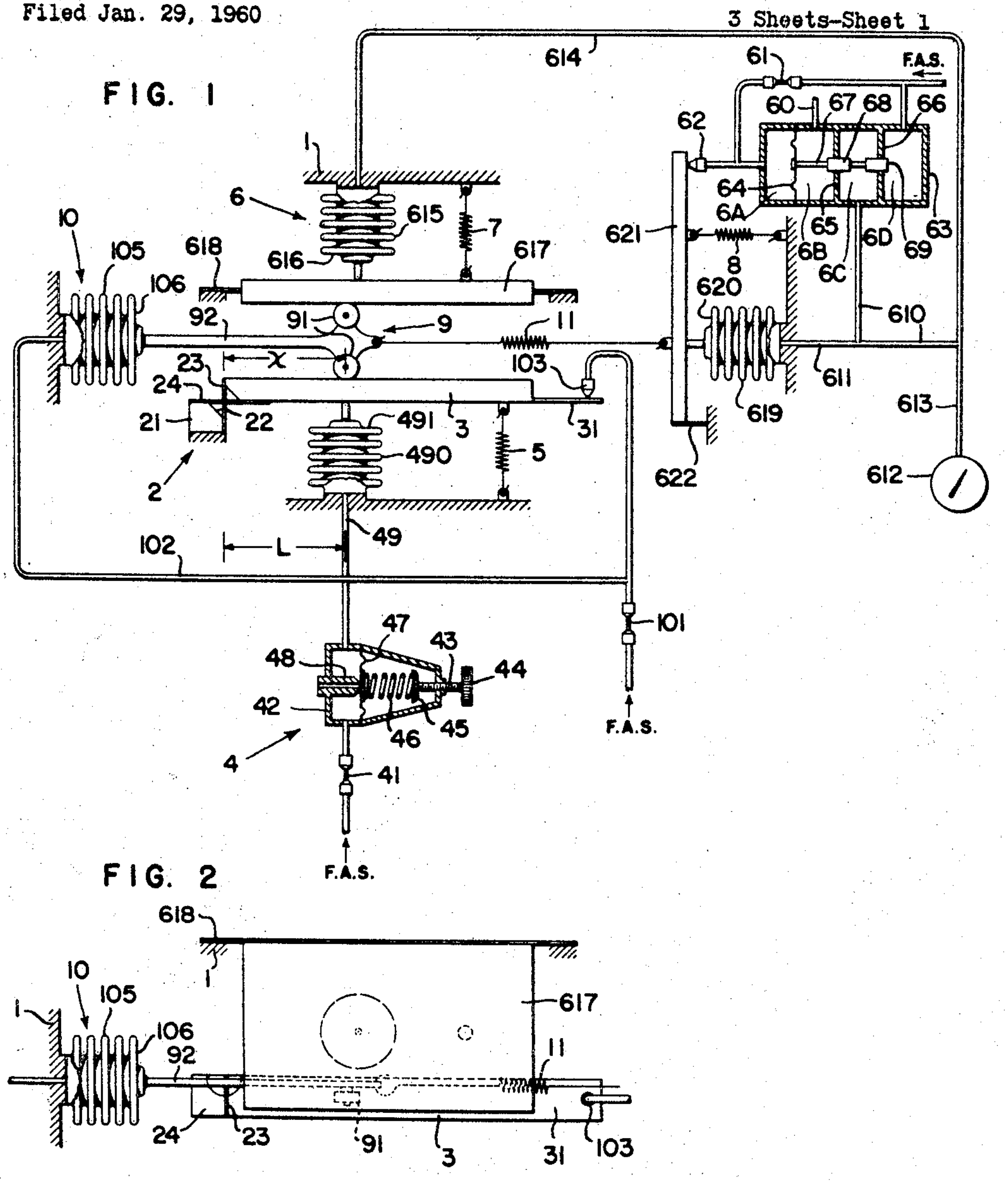
FIG. 1 is a diagrammatic or schematic view generally in side elevation.
FIG. 2 is a diagrammatic or schematic view in top or plan.

Referring to FIGS. 1 and 2, the computer comprises a stationary element 1 on which the various parts of the device are mounted. A support 2 provides means for guiding a movable member 3 for rectinear or rotary movement relative to the stationary element 1.

Support 2 is shown as comprising a flexure or cross spring pivot comprising a stationary block 21 having a corner 22 cut away. A vertical flat strip or spring 23 and a horizontal flat strip or spring 24 are each connected at one end to the block 21 and at the other end to the movable member or lever 3. Lever 3 is thus constrained for partial rotary or oscillatory movement about the support 2.

Means 4 are provided for applying a first input signal or force to lever 3 at a fixed distance from the axis of pivot 2.

This means 4 for applying a first force to lever 3 comprise a filtered fluid supply F.A.S. This fluid may be either an incompressible liquid, such as oil or water, or an elastic fluid, such as air. Means are provided for varying the pressure of the supply of fluid from this source. This variation may be done either manually as shown, or automatically by means of a measuring instrument responsive to any one of a great number of variables, such as temperature, etc.

This means 4 for varying the input forces applied by one input pressure is shown as comprising a fixed restriction 41 connected to a manually operable pressure regulator comprising a rigid case or housing 42 in which is mounted a screw 43 having a knurled head 44 and bearing at its opposite end, on a plate 45 which engages the upper end of a spring 46 which engages, at its lower end, with a flexible diaphragm 47 cooperating with an exhaust port 48 so as to vary the supply of fluid which flows through exhaust port 48 to surrounding atmosphere or to the oncoming or inlet side of the pump not shown, which supplies the source of fluid under pressure.

The conduit 49 leads from the variable pressure regulator 42—48 to first fluid-pressure-operated motor 490 having a movable end 491 which engages the lever 3 at a fixed distance L from the axis of the pivot 2.

A first bias spring 5 is connected to lever 3 and to stationary element 1 so as to move lever 3 in the direction opposite to that in which lever 3 is moved by motor 490.

Means 6 are provided for applying a second variable force to lever 3. Means 6 are adapted to apply a second input signal or a feed-back signal to lever 3 which signal may be varied and which may be applied at a point at a varying distance from the pivot 2 of lever 3 so as to vary the mechanical advantage of the input or feed-back signal applied to the lever 3.

Means 6 comprise a source of fluid under pressure which may be the same as the source which supplies the first input signal or which may be a different source. Fixed restriction 61 is connected to source F.A.S. and to nozzle 62. A second flapper 621 mounted on a flexure pivot 622 cooperates with nozzle 62. The pressure of the fluid escaping from the nozzle 62 actuates a relay comprising a rigid case 63 divided into four compartments 6A, 6B, 6C and 6D by a flexible diaphragm 64 and by rigid walls 65 and 66. The supply of fluid is connected to compartment 6D to the right of the rigid wall 66 so that the flow of fluid from compartment 6D is controlled by an inlet valve 69 connected by means of a rod 67 to the movable diaphragm 64 so that the inlet valve 69 is moved by the movable diaphragm 64. An output connection 610 is connected to the compartment 6C between the rigid walls 65 and 66 so that the inlet to compartment 6C is governed by the inlet valve 69 while the outlet fluid from compartment 6C (through compartment 6B and outlet orifice 60 to the surrounding atmosphere) is governed by the outlet valve 68 which connected to and moved by the movable diaphragm 64.

Outlet conduit 610 has three branches. Branch 611 connects to a fourth fluid-pressure-operated motor comprising a bellows 619 having a movable end 620 which bears upon second flapper 621 mounted on flexure pivot 622. A second branch 613 connects to a output element 612, such as an indicator, recorder or controller. A third branch 614 connects to a second fluid-pressure-operated motor comprising a bellows 615 having a movable end 616 engaging a cantilever 617 which is mounted on a second pivot 618 on stationary element 1. Second pivot 618 lies in the plane of the drawing while first pivot 2 is perpendicular to the plane of the drawing. Pivots 2 and 618 are therefore shown at right angles to each other. Other angles might be used.

A second bias spring 7 is connected to cantilever 617 and to stationary element 1 so as to move cantilever 617 in the opposite direction to that in which it is moved by second motor 615. A third bias spring 8 is connected to second flapper 621 and to stationary element 1 so as to bias flapper 621 in the direction opposite to that in which flapper 621 is moved by third motor 619.

Force-transmitting means 9 are provided for varying the distance at which the force from the second motor 615 as supplied to lever 3. These means comprise a pair of friction-reducing rollers 91 pivoted on a movable member 92 so as to be movable parallel to the pivot 618 of the cantilever 617 and at an angle to the pivot 2 of the lever 3 so that the distance X between the friction-reducing rollers 91 and the pivot 2 for the lever 3 is varied.

Means 10 are provided for moving the force-transmitting means 9. These means comprise a first valve having a flapper 31 formed by one end of lever 3 and a cooperating nozzle 103 which is connected to a supply of fluid under pressure F.A.S. through a fixed restriction 101 and a conduit 102. Conduit 102 leads to a third fluid-pressure-operated motor comprising a bellows 105 having a movable end 106 connected to the rod 92.

A spring 11 is connected at one end to rod 92 and at the other end to second flapper 621. Spring 11, flapper 621, and fourth bellows 619 thus constitute a force-varying means.

Figure 3:
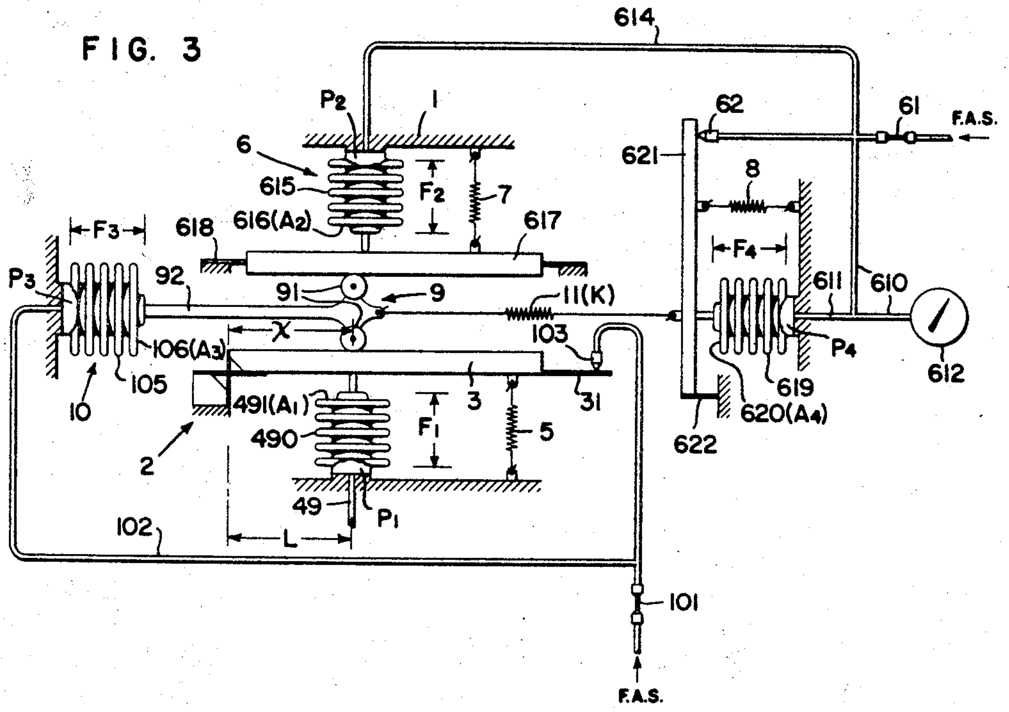
FIG. 3 is a simplified diagram of the computer connected to respond to an input signal and to produce an output signal which is the square root function of the input signal.

Operation of this modification of the device is as follows. The computer shown in FIGS. 1 and 2 is connected for square root extraction. A simplified diagram of the modification shown in FIGS. 1 and 2 is shown in FIG. 3. For simplicity, the relay 60—69 is omitted from FIG. 3. Reference may be had to FIG. 3. A variation in the input signal to bellows 490 varies the force F1 applied to lever 3 at a fixed distance L from the axis of pivot 2. Force F1 thus rocks lever 3 about pivot 2 and actuates the first flapper-nozzle valve by moving flapper 31 toward or away from nozzle 103. This movement of flapper 31 varies the escape of fluid through nozzle 103 and consequently varies the pressure of the supply of fluid in conduit 102 and third motor 105 and causes the movable end 106 of third motor 105 to move rod 92 and consequently the force-transmitting means 9. Force-transmitting means 9 moves at an angle to the axis of pivot 2 and consequently varies the distance X at which the force F2 is applied from the second motor 615 to lever 3. The distance X can be varied independently of the distance L which is constant. Force-transmitting means 9 moves parallel to the axis 618 of cantilever 617. Consequently, the force F2 from cantilever 617 is applied to force-transmitting means 9 at a constant mechanical advantage.

Movement of force-transmitting 9 varies the length and consequently the tension K of spring 11 and consequently rocks second flapper about the axis of its pivot 622. This rocking movement of flapper 621 actuates the second fluid-pressure-controlling valve comprising flapper 621 and nozzle 62 and varies the pressure of the fluid applied to the flexible diaphragm 64 (FIG. 1) and causes the flexible diaphragm 64 to move and consequently to open either inlet valve 69 or exhaust valve 68. Opening of inlet valve 69 or exhaust valve 68 varies the pressure in the chamber 6C between the rigid walls 65 and 66 and consequently the pressure of the fluid in the output conduit 610.

The output pressure (P0) in output conduit 610 is applied through conduit 611 to the fourth fluid-pressure-operated motor comprised by bellows 619 and varies the feed-back of pressure which this fourth motor 619 applies to flapper 621. The output pressure P0 is also applied to an output element 612 comprising an indicator, recorder or controller of well known construction. The output pressure P0 is also applied through conduit 614 to the second fluid-pressure-operated motor comprised of bellows 615 which has a movable end 616 engaging cantilever 617 and applying pressure through cantilever 617 and means 9 to lever 3. Second motor 615 thus applies an input or feed-back F2 to lever 3 in a direction opposite to that in which input F1 is applied to lever 3.

Referring FIG. 3, the input signal comprises a force F1 composed of a pressure P1 applied to the area A1 of the first fluid-pressure-operated motor 490. This force F1 is applied to lever 3 at a fixed distance L from the axis of pivot 2. A feed-back force F2 is applied by second fluid-pressure-operated motor 615 through cantilever 617 and force-transmiting means 9 to lever 3 at a distance X from the pivot 2 for lever 3. This distance X is varied. A third force F3 is applied to a third fluid-pressure-operated motor 105 and thence to rod 92 and pressure-transmitting means 9 so as to vary this distance X. Force F3 comprises a pressure P3 applied to area A3 of the movable end 106 of motor 105. The feed-back force F4, comprising a pressure P4 applied to area A4 of the movable end 620 of fourth motor 619, is applied to second flapper 621. In FIG. 3, the pressures P2 and P4 are also the output pressure P0.

The three bias springs 5, 7 and 8 are set so that no action occurs until the input and output pressures are at least three pounds per square inch (hereinafter p.s.i.).

The equations for square root extraction, as shown in FIG. 3, are:

($P1$ minus 3) multiplied by $A1$ multiplied by $L$=($P0$ minus 3) multiplied by $A2$ multiplied by $X$.

$K$ multiplied by $X$=($P0$ minus 3) multiplied by $A4$.

or, by substituting $X$, ($P1$ minus 3)=($P0$ minus 3)$^2$ multiplied by $A2$ multiplied by $A4$ divided by $K$ multiplied by $L$ multiplied by $A1$.

Since $A1$, $A2$, $A4$, $K$ and $L$ are all constants, the expression ($A2$) ($A4$) divided by ($K$) ($L$) ($A1$) can be adjusted to equal 1 divided by 12.

Consequently, the desired square root equation ($P1$ minus 3)=($P0$ minus 3)$^2$ divided by 12 is obtained.

Figure 4:
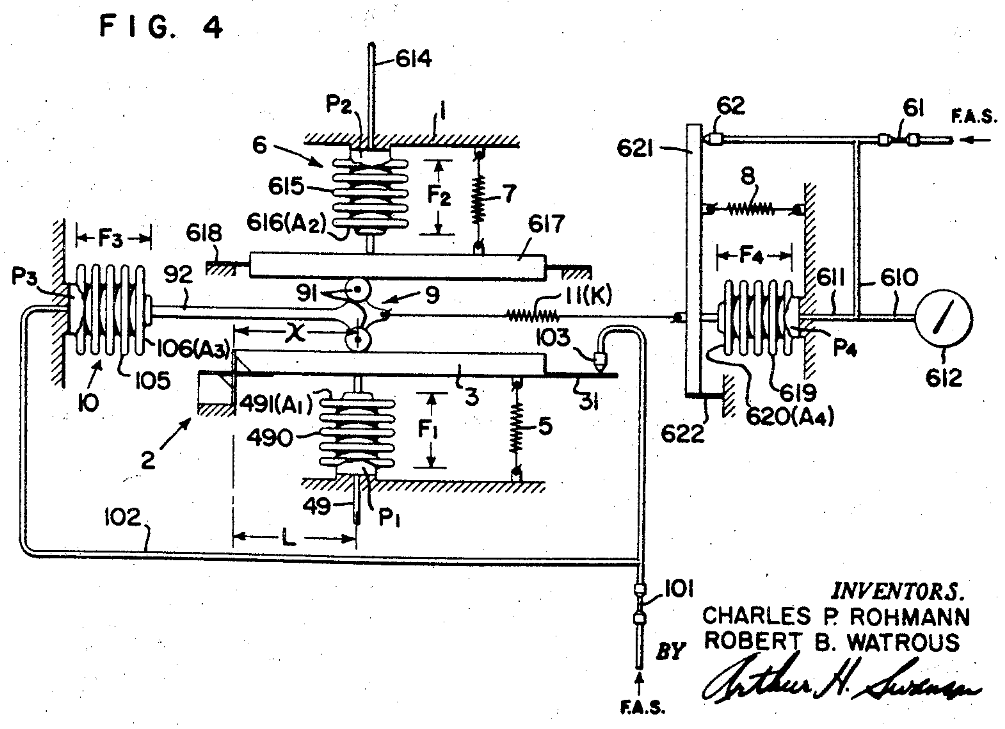
FIG. 4 is a simplified diagram of the computer connected to respond to an input signal and to produce an output signal which is a quotient of the input signals.

FIG. 4 shows the computer arranged for division. The input forces F1 and F2 are independent of each other. The input force F1 is represented by the pressure of the fluid which is applied to the area A1 of the movable end of 491 of the bellows 490. The independent input force F2 is represented by the pressure P2 of the fluid in the bellows 615 which is applied to the movable end 616 having an area A2. The force F3 is represented by the pressure P3 of the fluid in the bellows 105 which is applied to the movable end 106 having area A3. The fluid pressure P3 is controlled by the flapper-nozzle valve 31—103. The feedback force F4 is represented by the pressure P4 in the bellows 619 which is applied to its movable end 620 having an area A4. Bias springs 5, 7, and 8 are applied to the device in FIG. 4.

The equations for division are:

($P1$ minus 3) ($A1$)($L$)=($P2$ minus 3)($A2$)($X$)
($K$)($X$)=($P4$ minus 3)$A4$ Therefore, ($P1$ minus 3) divided by ($P2$ minus 3) =($A4$)($A2$)($P4$ minus 3) divided by ($A1$)($L$)($K$).

Since $A1$, $A2$, $A4$, $L$ and $K$ are all constants ($P4$ minus 3), which equals the output pressure applied to the output element, is equal to ($P1$ minus 3) divided by ($P2$ minus 3).

Figure 5:
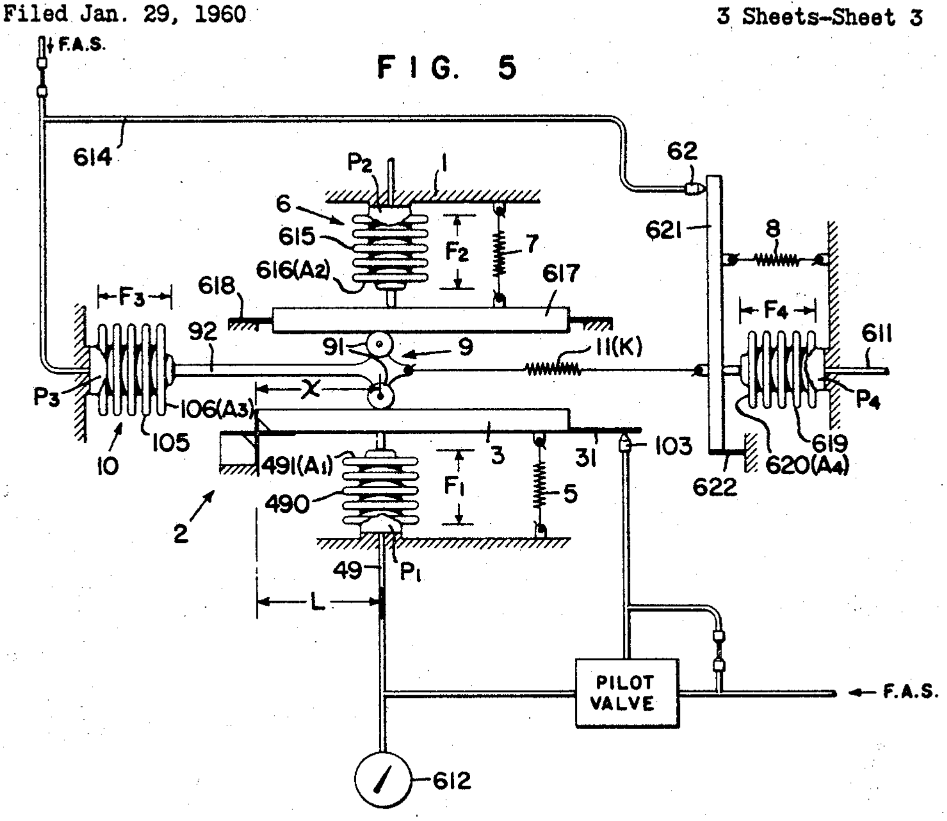
FIG. 5 is a simplified diagram of the computer connected to respond to two input signals and to produce an output signal which is the product of the multiplication of the input signal by another input signal so as to produce the multiplied product of the input signals or so as to produce the square function of the input signals.

FIG. 5 shows the computer arranged for multiplication. In this modification, the input force F4 and the input force F2 are independent of each other. If it is desired to use the device to obtain the square function, the input forces F4 and F2 are made equal to each other. The feed-back force F1 is equal to the pressure P1 applied to the removable end 491 having an area A1 of the bellows 490. The feed-back pressure P1 is equal to the output pressure P0 and is applied to the output element. The input force F2 is equal to the pressure P2 applied to the movable end 616 having an area A2 of bellows 615. The force F3 is equal to the pressure P3 applied to the movable end 106 having an area A3 of the bellows 105. The independent input force F4 is equal to the pressure P4 applied to the movable end 620 having an area A4 of the bellows 619.

The equations for multiplication are as follows:

($P1$ minus 3) ($A1$)($L$) equals ($P2$ minus 3) ($A2$)($X$)
($K$)($X$)=($P4$ minus 3)($A4$).

Therefore, ($P1$ minus 3) equals ($P2$ minus 3)($P4$ minus 3)($A2$)($A4$) divided by ($K$)($A1$)($L$).

P1 is equal to the output pressure P0 which is applied to the output element 612.

In summary, it will be seen that this invention provides a computer which can perform the mathematical functions of multiplication, squaring division or square root extraction in which one force is introduced or fed-back with a fixed mechanical advantage, and without disturbance of or interaction with any other force.

What is claimed is:

1. In an air-pressure-operated computer, a first stationary pivot, a first lever mounted for turning movement about said stationary pivot, a first air-pressure-operated motor mounted to apply a force to said first lever at a fixed distance from said first pivot, a second air-pressure-operated motor mounted to apply a force to said first lever in the opposite direction to the force applied by said first motor, a cantilever mounted to receive the force of said second motor and to transmit it, a stationary pivot for said cantilever at an angle to said stationary pivot for said first lever, friction-reducing means contacting said first lever and said cantilever and mounted for movement parallel to the pivot for said cantilever and at an angle to the pivot for said first lever, a third air-pressure-operated motor connected to move said friction-reducing means, a first flapper-nozzle valve mounted to be moved by said first lever and connected to a source of air under pressure so as to vary the pressure of a supply of air from said source, a connection between said supply of air and at least one of said motors, means connecting at least one of said motors other than those connected to said supply of air to a supply of air under pressure which is varied to provide an input signal, a bias spring connected to said first lever to move it in the direction opposite to that in which said first lever is moved by said first motor, a bias spring connected to said cantilever to move said cantilever in a direction opposite to that in which said cantilever is moved by said second motor, a third stationary pivot, a second flapper mounted on said third pivot for turning movement about said third pivot, a third bias spring connected to said friction-reducing means so that the tension of said third bias spring is varied by the movement of said friction-reducing means and to said second flapper, a fourth bias spring connected to said second flapper so as to turn said second flapper about said third pivot in one direction, a second nozzle connected so as to be actuated by said second flapper and forming therewith a second flapper-nozzle valve, a pilot valve connected under the control of said second flapper-nozzle valve and to a source of air under pressure so as to vary the pressure of a second supply of pressure from said source, a fourth air-pressure-operated motor connected to apply a force to said second flapper in the direction opposite to the force applied to said second flapper by said fourth bias spring, conduit connecting said second supply of air under pressure to said fourth motor and to said second motor, and an output element connected to said second supply of air under pressure so as to be actuated thereby.

2. An air-pressure-operated computer providing an output signal which is a function of at least one variable input signal, said computer including in combination, a lever, means providing a pivotal support for said lever, means providing a first force against said lever at a fixed distance from said pivotal support, means providing a second force against said lever and disposed to exert a turning moment against said lever opposite to that exerted by said first force, at least one of said forces constituting a variable input signal, force-transmitting means for varying the turning moment exerted by another of said forces other than said one force against said lever, a cantilever located between said means providing said another of said forces and said force-transmitting means, valve means controlled by the pivotal movement of said lever in response to unbalance of the turning moments acting thereon for regulating a fluid pressure, an air-pressure-operated motor having a movable member connected to said force-transmitting means for varying the position of said force-transmitting means in a direction longitudinally of said lever in response to changes in said fluid pressure, so as to cause said air-pressure-operated motor to move said force-transmitting means to a position in which the turning moments acting on said lever are balanced, and means for response to a condition indicating the position of said lever for providing an output signal which is a function of said input signal.

3. An air-pressure-operated computer providing an output signal which is a function of at least one variable input signal, said computer including in combination, a stationary element, a support mounted on said stationary element, a member mounted on said support for movement in a predetermined path relative to said support, a first air-pressure-operated motor mounted so as to apply a force to said member to move said member relative to said support, a second air-pressure-operated motor mounted so as to apply a second force to said member so as to move said member relative to said support in the opposite direction, a stationary pivot, a cantilever mounted on said stationary pivot so as to receive the force of said second motor, means varying the force applied by said cantilever to said member, a third air-pressure-operated motor connected to and actuating said means varying the force applied by said cantilever to said member, a valve adapted for connection to a source of air under pressure and adapted to varying the pressure of a supply of air from said source, means connecting at least one of said motors to a variable supply of air under pressure providing an input signal, means connecting at least one of said motors other than the motor connected to said input signal to the supply of air varied by said valve, and an output element connected to at least one of said motors other than the motor connected to said input signal and providing an output signal.

4. In a fluid-pressure-operated computer, a first lever pivotally mounted on a first pivot, means applying a first force to said first lever, a cantilever pivotally mounted on a second pivot at an angle to the axis of said first pivot, means applying a force to said cantilever in the opposite direction to the force applied to said first lever, force-transmitting means movable linearly along said first lever and said cantilever at an angle to said first pivot and parallel to said second pivot so as to transmit to said first lever a force applied to said cantilever at a mechanical advantage which is constant, whereby the force from said cantilever is applied to said force-transmitting means and to said first lever and the distance between said first pivot and said force-transmitting means is varied and is independent of said means applying force to said first lever.

5. In a fluid-pressure-operated computer, a first lever pivotally mounted on a first pivot, means applying a force to said first lever, a cantilever pivotally mounted on a second pivot at an angle to the axis of said first pivot, means applying a force to said cantilever at a mechanical advantage which is constant and in the opposite direction to the force applied to said first lever, force-transmitting means movable linearly along said first lever and said cantilever at an angle to said first pivot and parallel to said second pivot for transmitting to said first lever force applied to said force-transmitting means, whereby the force from said cantilever is applied to said force-transmitting means and to said first lever and the distance between said first pivot and said force-transmitting means is varied and is independent of said means applying force to said first lever, force-varying means pivotally mounted on a third pivot, means under the control of said force-varying means for applying a force to said first lever or to said cantilever or to said force-transmitting means, and a spring connected between said force-transmitting means and said force-varying means, whereby movement of said force-transmitting means simultaneously varies the tension of said spring and the position of said force-varying means.

6. In an air-pressure-operated computer, a staitonary pivot, a lever mounted for turning movement about said stationary pivot, a first motor mounted to apply a force to said lever at a fixed distance from said pivot, a second stationary pivot at an angle to the stationary pivot for said lever, a cantilever mounted on said second stationary pivot, a friction-reducing means mounted for movement at an angle to said stationary pivot for said lever and parallel to said second stationary pivot, a second motor mounted to apply a force to said lever in the opposite direction to the force applied to said lever by said first motor, said force from said second motor being transmitted by said cantilever and by said friction-reducing means, a third air-pressure-operated-motor connected to move said friction-reducing means, a first flapper-nozzle valve mounted to be moved by said lever and connected to a source of air under pressure so as to vary the pressure of a first supply of air from said source, means for connecting at least one of said motors to a source of air under pressure which is varied to provide an input signal, means for connecting said first valve to at least one of said motors other than the motor connected to said input signal, a spring connected to said friction-reducing means so that the tension of said spring is varied by the movement of said friction-reducing means, a second flapper-nozzle valve mounted to be moved by said spring and connected to a source of air under pressure so as to vary the pressure of a second supply of air from said source, means connecting said second supply of air under pressure to at least one of said motors other than the motors connected to said input signal, and an output element connected to said first or to said second supply of air under pressure so as to be actuated thereby.

7. Means for applying a force to a lever at a constant mechanical advantage and at a varying distance from the pivot of said lever, including, a stationary element, a stationary pivot mounted on said element at an angle to the pivot of the lever, a cantilever mounted on said pivot for turning movement thereabout, a force-transmitting element located between said cantilever and the lever and movable parallel to the pivot of the cantilever and at an angle to the pivot of the lever, an air-pressure-operated motor mounted on said stationary element and having a movable part engaging said cantilever and transmitting force thereto, and another air-pressure-operated motor having a movable part connected to said force-transmitting element to move it.

8. Means for applying a force to a lever at a constant mechanical advantage and at a varying distance from the pivot of said lever, including, a stationary element, a stationary pivot mounted on said element at an angle to the pivot of the lever, a cantilever mounted on said stationary pivot for movement thereabout, a force-transmitting element located between said cantilever and the lever and movable parallel to the pivot of said cantilever and at an angle to the pivot of the lever, an air-pressure-opereated motor having a movable part engaging with said cantilever and transmitting force thereto, another air-pressure-operated motor having movable part connected to said force-transmitting means to move it, a source of air under pressure, a valve located for operation by the lever and connected to said source so as to vary pressure of a supply of air from said source, and a conduit connecting said supply of air from said valve to one of said motors.

References Cited in the file of this patent

UNITED STATES PATENTS

| | | |
|---|---|---|
| 2,317,293 | Newell | Apr. 20, 1943 |
| 2,487,310 | Chandler | Nov. 8, 1949 |
| 2,507,498 | Brown | May 16, 1950 |
| 2,736,199 | Ibbot | Feb. 28, 1956 |